Dec. 6, 1927.  
A. M. SAMSON  
COLANDER  
Filed Sept. 13, 1926  
1,652,053
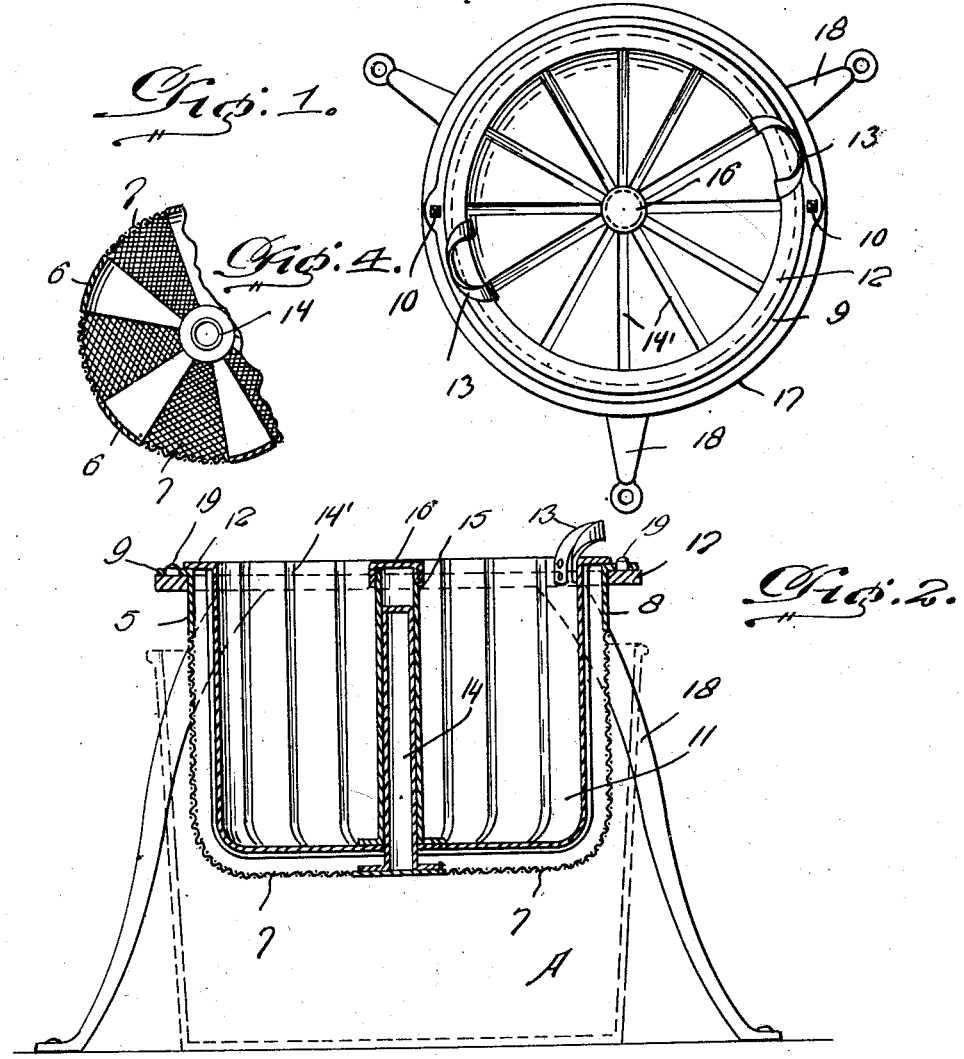
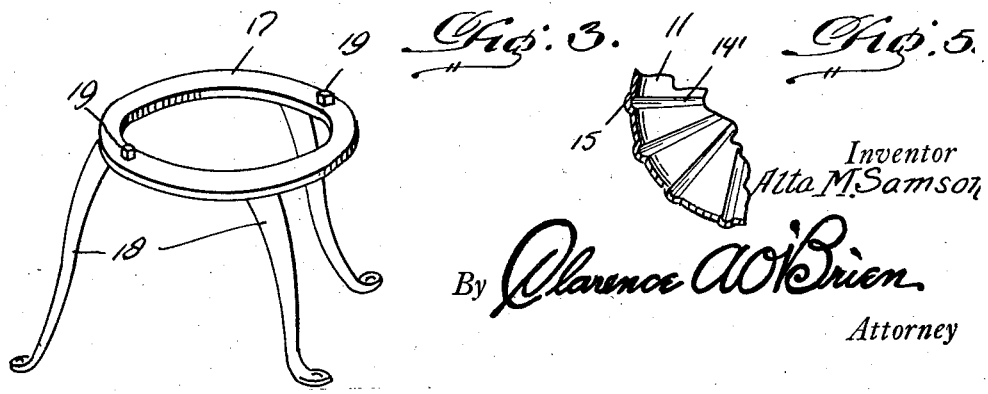
Inventor  
Alta M. Samson  
By Clarence A. O'Brien  
Attorney Patented Dec. 6, 1927.

1,652,053

UNITED STATES PATENT OFFICE.

ALTA M. SAMSON, OF ALBION, NEBRASKA.

COLANDER.

Application filed September 13, 1926. Serial No. 135,151.

This invention relates to new and useful improvements in colanders and has for its primary object to provide a device of this character that is highly adapted for use in the squeezing of pulp of fruit or vegetables and this without requiring great effort on the part of the operator.

An additional object of the invention is to provide a colander wherein the parts thereof are readily removable so as to facilitate the proper cleaning of the various structural elements.

Other objects will become apparent as the nature of the invention is better understood, the same comprising the novel form, combination, and arrangement of parts hereinafter more fully described, shown in the accompanying drawing and claimed.

In the drawing wherein like numerals indicate like parts:

Figure 1 is a view in top plan of a colander constructed in accordance with the present invention, Fig. 2 is an enlarged detailed vertical section of the colander per se the supporting unit therefor being disclosed in dotted lines while also disclosed in dotted lines is a conventional form of pan for receiving the pulp and juices discharging from the colander, Fig. 3 is a perspective of the colander supporting means, Fig. 4 is a fragmentary section of the screen unit of the colander, and Fig. 5 is a fragmentary section of the pressing unit of the colander.

Now having particular reference to the drawings wherein there is disclosed the most preferred embodiment of the invention with which I am at this time familiar, the colander per se constitutes the provision of a fan-shaped receptacle 5 consisting of sheet metal and wire meshed screen sections 6 and 7 respectively, the screen section 7 being preferably wider than the sheet metal section 6 as is clearly indicated in Fig. 4. The top open side of this receptacle 5 is formed with a metallic band 8, the upper edge of which is formed with an outwardly directed circumferential flange 9 formed at diametrically opposed points with lug receiving openings 10—10.

The colander further constitutes the provision of a pressing unit 11 of pan-like formation constructed for disposition within the screen receptacle 5 and being of such dimensions as to be in spaced concentric relation with the receptacle 5 as clearly indicated in Fig. 2. The upper end of this squeezing unit 11 is formed with a laterally directed circumferential flange 12 that will rest upon the inner edge of the flange 9 of the screen receptacle 5. At the top open side of the squeezing unit 11 there is provided at diametrically opposed points handles 13—13 to facilitate the rotation of the squeezing unit within the screen unit.

Formed in the side and bottom walls of the squeezing unit 11 are outwardly directed corrugations 14 so as to provide ribs 15 upon the outer surface of the unit which will facilitate the squeezing of the fruits or vegetables in the space between the screen receptacle and said squeezing unit.

For centering the squeezing unit 11 with the screen receptacle 5 said screen receptacle is provided at its bottom with a vertically projecting hollow tub 14 for loose disposition within a vertical tube 15 upon the bottom wall of the squeezing unit 11, the lower end of said tube being open and registering with an opening in the bottom wall of the squeezing unit so as to permit the screen tube 14 to project therein. Preferably the upper end of the tube 15 is provided with a removable screw cap 16 so as to facilitate the cleaning of said tube.

The invention further constitutes the provision of a means for supporting the collander in position above the table or other support, this means consisting of a circular ring 17 from the under side of which depend a plurality of outwardly converging supporting legs 18. The center of this ring is of such diameter as to permit the colander to be readily disposed therein and upon the top side of the ring 17 at diametrically opposed points are vertically projecting lugs 19 for engagement within the opening 10—10 of the screen receptacle flange 9, obviously resulting in the holding of the screen receptacle from rotation during the operation of the device.

In actual practice a juice and pulp receiving pan A is disposed beneath the ring 17 of the supporting unit after which the colander is arranged within the support as indicated at Fig. 2. After the fruit or vegetables have been deposited within the screen receptacle 5, the squeezing unit 11 is disposed within the receptacle and forced downwardly and turned in reverse direction by reason of the handles 13—13. Obviously the fruit or vegetables will be pressed to such an extent that all juices and pulp will be forced therefrom and caught in the pan A.

It will also be seen that I have provided a highly novel, simple and efficient form of colander together with a supporting unit therefor that is well adapted for all of the purposes heretofore designated and even though I have herein shown and described the invention as consisting of certain detailed structural elements, it is nevertheless to be understood that some changes may be made therein without affecting the spirit and scope of the appended claim.

Having thus described my invention, what I claim as new and desire to secure by Letters Patent is:—

A device of the class described including, in combination, a ring-shaped member, means for supporting the ring-shaped member, a material receiving screened receptacle, a circumferential flange upon the upper end of the receptacle and restable on the ring-like member, means for preventing rotation of the flange on the ring-like member, a squeezing unit adapted for loose disposition within the receptacle in spaced relation therewith and adapted to be rotated in said receptacle, a vertical tube at the bottom of the receptacle, a vertical tube at the bottom of the squeezing unit open at its lower end for receiving the tube of the receptacle for properly centering the squeezing unit in respect to the receptacle, an annular flange projecting outwardly from the upper end of the squeezing unit and abuttable with the flange of the receptacle to limit the downward movement of the unit in the receptacle.

In testimony whereof I affix my signature.

ALTA M. SAMSON.